United States Patent
Van Bezooijen et al.

(10) Patent No.: US 7,233,631 B2
(45) Date of Patent: Jun. 19, 2007

(54) DC-OFFSET CORRECTION CIRCUIT HAVING A DC CONTROL LOOP AND A DC BLOCKING CIRCUIT

(75) Inventors: Adrianus Van Bezooijen, Nijmegen (NL); Marc Victor Arends, Eindoven (NL); Hermana Wilhelmina Hendrika De Groot, Eindhoven (NL)

(73) Assignee: NXP B.V., Eindhoven ( * ) Notice: Subject to any disclaimer, the term of this patent is extended or adjusted under 35 U.S.C. 154(b) by 1106 days.

(21) Appl. No.: 09/988,943

(22) Filed: Nov. 19, 2001

(65) Prior Publication Data

US 2002/0075892 A1 Jun. 20, 2002

(30) Foreign Application Priority Data

Nov. 23, 2000 (EP) .................................. 00204164

(51) Int. Cl.
*H04L 25/06* (2006.01)
(52) U.S. Cl. .................................................... 375/319
(58) Field of Classification Search ................. 375/319
See application file for complete search history.

(56) References Cited

U.S. PATENT DOCUMENTS 5,422,889 A * 6/1995 Sevenhans et al. .......... 370/442
5,918,169 A * 6/1999 Dent ............................ 455/324
6,606,359 B1 * 8/2003 Nag et al. .................... 375/348

FOREIGN PATENT DOCUMENTS

EP 0364035 A2 10/1999

* cited by examiner

*Primary Examiner*—Derrick W. Ferris
(74) *Attorney, Agent, or Firm*—Michael Ure

(57) ABSTRACT

A DC-offset correction circuit (I1, Q1) for a low-IF or zero-IF receiver, comprises a DC-offset control loop (O1, O2) embodied by: a summing device (9-1, 9-2) having a signal path input (10-1, 10-2), a DC control input (11-1, 11-2), and a summing output (12-1, 12-2); and an offset determining means (15-1, 15-2) coupled between the summing output (12-1, 12-2) and the DC control input of the summing device (9-1, 9-2). The DC-offset correction circuit (I1, Q1) further comprises a DC blocking circuit (17-1, 17-2) coupled to the summing output (12-1, 12-2) of the summing device (9-1, 9-2) and having a DC blocking output (18-1, 18-2) for providing an offset corrected output signal. The DC-offset control loop (O1, O2) and the DC blocking circuit (17-1, 17-2) advantageously interact in correcting DC offset.

7 Claims, 1 Drawing Sheet

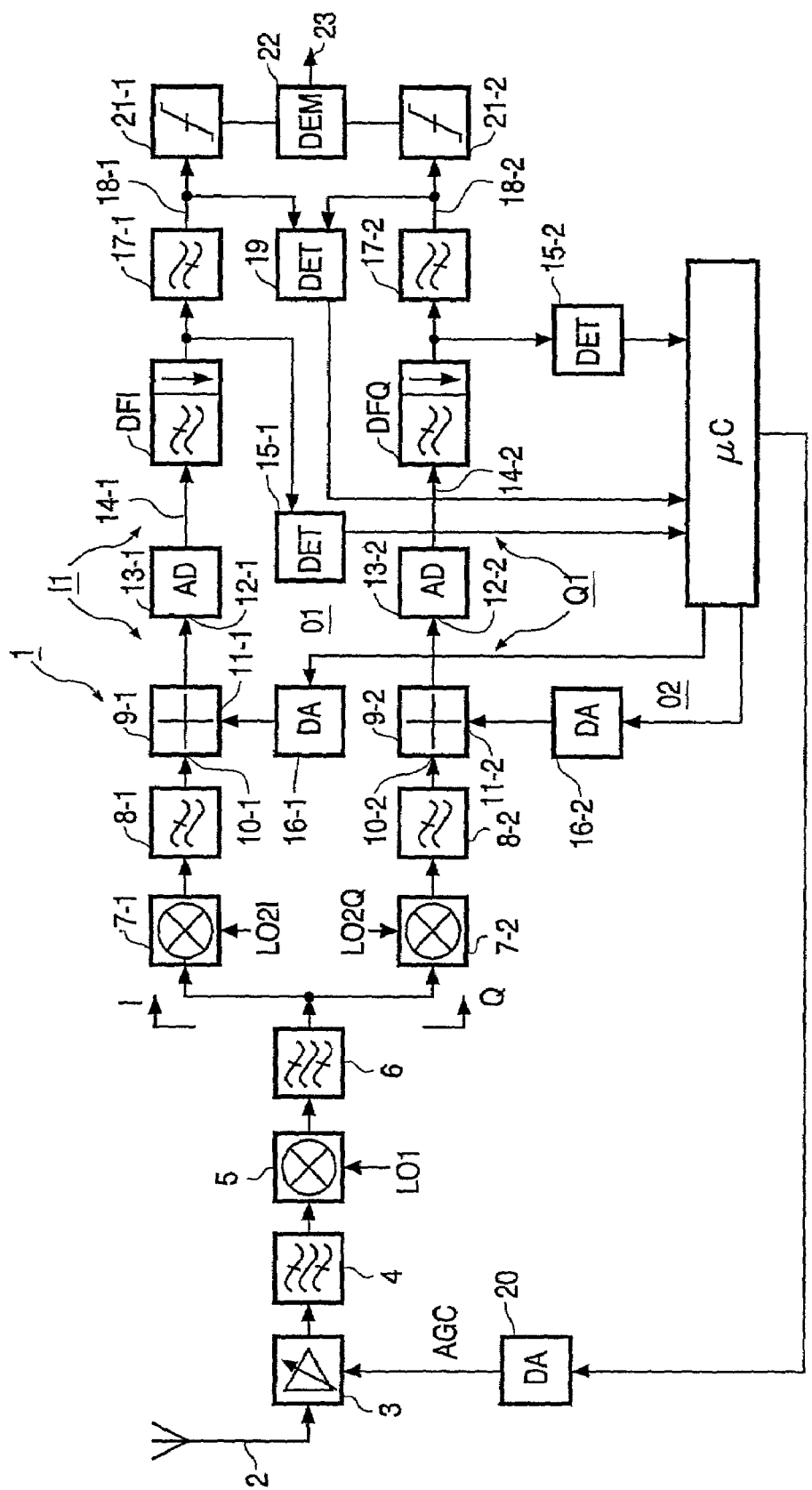

DC-OFFSET CORRECTION CIRCUIT HAVING A DC CONTROL LOOP AND A DC BLOCKING CIRCUIT

The present invention relates to a DC offset correction circuit, comprising a DC-offset control loop embodied by: a summing device having a signal path input, a DC control input, and a summing output; and an offset determining means coupled between the summing output and the DC control input of the summing device.

The present invention also relates to a receiver provided with such an DC-offset correction circuit.

Such an DC-offset correction circuit is known from U.S. Pat. No. 5,422,889 (=EP-A-0 594 894). The known DC-offset correction circuit, which is included in both quadrature paths of a baseband circuit in a direct conversion receiver comprises a first DC-offset control loop. The first DC-offset control loop includes a summing device having an analog baseband signal input, at least one DC control input and a summing output; an analog to digital (AD) convertor coupled to the summing output of the summing device and having an AD convertor output; an offset determining means in the form of an averaging circuit coupled to the AD convertor output; and a digital to analog (DA) convertor coupled between the offset determining means and the at least one DC control input of the summing device. On the one DC control input an offset representative signal is applied which is derived from offset determined by the averaging circuit and/or from offset read from memory means present in the baseband circuit. The direct conversion receiver also comprises a second DC-offset control loop having a series arrangement of a comparator acting as a one bit further analog to digital convertor and a further digital to analog convertor for providing a further offset compensation signal, which is fed to a second DC control input of the summing device in order to further compensate for DC offset.

For an accurate compensation of offsets originating from a variety of possible DC-offset sources, like supply voltage variations and temperature variations, both DC-offset control loops have to be implemented and controlled very accurately. The accuracy of the DC-offset compensation particularly depends on the accuracy of the several digital to analog converters in the control part of the DC-offset control loops. The higher the latter accuracy the higher the complexity, costs, chip area and power consumption of these convertors are. This poses a limit to the practically feasible accuracy and thus to the specifications of the kind of receivers, such as low-IF receivers, near zero IF receivers, and zero-IF receivers, which tend to be very popular nowadays.

Therefore it is an object of the present invention to provide a DC-offset correction circuit for application in for example a receiver, which poses reduced demands on the DC-offset control loop, while nevertheless possesses improved DC offset specifications.

Thereto the DC-offset correction circuit according to the invention is characterised in that the DC-offset correction circuit further comprises a DC blocking circuit coupled to the summing output of the summing device and having a DC blocking output for providing an offset corrected output signal.

Surprisingly it has been found that by providing a DC blocking circuit in the signal path, the severe requirements posed on the DC-offset control loop specifications for achieving an adequate DC-offset correction operation can be weakened significantly. It is to be noted that application of the DC blocking circuit in combination with the DC loop above conversely results in similarly weakened requirements posed on the specifications of the DC blocking circuit, as well as on the specifications of the DC-offset control loop. In particular the order of the DC filter characteristics of the DC blocking circuit or in the case concerned the resolution of the DC filter characteristics can be reduced, which saves chip area. Furthermore the reduced order leads to a shorter settling/response time of the DC blocking circuit, which improves the data transmission rate of a receiver provided with such an offset correction circuit.

The DC blocking circuits, which used to be applied in the prior art analog DC-offset correction circuits comprise a capacitor having a large value, which gives rise to a voluminous capacitor, which is difficult to integrate on a limited chip area, and which has a correspondingly large leakage current. Such a large value capacitor can be omitted by transposing part of the requirements respecting the wanted DC-offset specifications to the DC blocking circuit, or vice versa. In addition a large degree of design flexibility is achieved because, either an analog, or a digital implementation of the DC blocking circuit can be realised.

It has further been found that there exists a trade off between the component specifications of the DC-offset control loop and the DC blocking circuit when it comes to achieving DC offset correction. This trade off preserves the advantages of each of these components and advantageously results in an increased design flexibility and in increased tolerances of the parts of the offset correction circuit according to the invention. These parts and corresponding circuit components can therefore be integrated more easily requiring a less accurate integration process.

An easy to implement embodiment of the DC blocking circuit according to the invention is characterised in that the DC blocking circuit comprises a high pass filter.

An embodiment of the receiver according to the invention provided with such a DC-offset correction circuit is characterised in that the receiver comprises channel filter means coupled between the summing device and the DC blocking circuit. These the channel filter means may in a further embodiment of the receiver or the DC-offset correction circuit comprise analog or digital filters, in case of an analog or digital implementation respectively of said channel filter means.

These channel filter means act as selectivity filter and may be embodied, either analog or digital. In an analog implementation of the channel filter means, for example gyrator filters may be used, whereas in a digital filter implementation, which requires no capacitors, decimation filters may be included. These decimation filters are for suppressing quantisation noise produced by sigma-delta AD converters, whereby the digital channel filter provides the necessary roll-off of the filter characteristic in order to meet channel selectivity requirements of the receiver according to the invention.

Several embodiments of the receiver according to the invention may be implemented providing additional device flexibility. Examples thereof are: quadrature receivers, low-IF receivers, and zero-IF receivers. These receivers can include direct conversion, double conversion or the like.

A still further embodiment of the receiver according to the invention is characterised in that the receiver is provided with switchable means. These switchable means may advantageously be used for switching on and off the local oscillator(s) and/or automatic gain control in the receiver, such that during periods of silence any DC offset can be determined and at wish be stored for use during operational periods of the receiver.

At present the DC-offset correction circuit according to the invention and receiver provided therewith will be elucidated further together with their additional advantages, while reference is being made to the appended drawing showing a detailed embodiment of such a receiver provided with an offset correction circuit according to the invention.

The sole FIGURE shows an detailed embodiment of a receiver 1 according to the present invention.

Such a receiver 1 is capable of receiving modulated signals. Examples thereof are narrow-band receivers for receiving Frequency Shift Keying (FSK), such as 4-FSK signals, FM modulated signals or the like. Paging, the relatively new standard named 'bluetooth', remote meter reading, security (car theft) are some of the application areas. Apart from possible bandpass filters (not shown), the so called front-end of the receiver 1 is provided with an antenna 2, a low noise amplifier 3, whose gain is controllable through an Automatic Gain Control (AGC) signal, a band pass filter 4, and a local oscillator 5—which in the embodiment as shown is the first local oscillator providing a first local oscillator signal LO1—and having an IF filter 6.

The exemplified receiver 1 is a zero-IF quadrature receiver. The receiver as shown has in particular an I path and a Q path, each of the respective paths is provided with successively second local mixers 7-1, 7-2 for mixing down the input I and Q signals respectively, by means of second local oscillator signals LO2I and LO2Q; and low pass filters 8-1, 8-2 respectively for providing respective I and Q analog baseband signals. The receiver 1 is provided with respective I and Q DC-offset correction circuits I1, Q1 each in the form of DC-offset control loops O1 and O2. Each DC-offset control loop is provided with a summing device in the form of a subtracter 9-1, 9-2. Each subtracter has an signal input 10-1, 10-2, a subtracting DC control input 11-1, 11-2, and a summing output 12-1, 12-2. Each DC-offset control loop O1 and O2 has in a digital implementation of the DC-offset correction circuit (I1, Q1), an analog to digital (AD) convertor 13-1, 13-2 coupled to the respective summing output 12-1, 12-2 of the subtracter 9-1, 9-2. Each AD convertor 13-1, 13-2 has an output 14-1, 14-2. Each loop O1, O2 further has an DC-offset determining means 15-1, 15-2 coupled to the respective outputs 14-1, 14-2 of the respective analog to digital convertors 13-1, 13-2; and a digital to analog convertor 16-1, 16-2 coupled between the offset determining means 15-1, 15-2 and the subtracting DC control input 11-1, 11-2 of the respective subtracters 9-1, 9-2. In addition the DC-offset correction circuits I1 and QI further comprise respective DC blocking circuits 17-1, 17-2 coupled to the summing outputs (12-1, 12-2) of the summing devices (9-1, 9-2) via the outputs 14-1, 14-2 of the AD convertor 13-1, 13-2. The DC blocking circuits 17-1, 17-2 have respective DC blocking outputs 18-1, 18-2 for providing DC-offset corrected output signals in a way to be described later. As shown the coupling of the DC blocking circuits 17-1, 17-2 to the AD convertors 13-1, 13-2 is effected here through respective digital channel filter means DFI, DFQ. In the embodiment as shown the digital filter means DFI, DFQ are embodied as decimation channel filters used for suppressing quantisation noise of the respective AD convertors 13-1, 13-2 and for down sampling the digital filter input data. The channel filters provide the frequency characteristic roll-off needed to meet the channel selectivity requirements of the receiver 1. Both DC blocking outputs 18-1, 18-2 are coupled to an amplitude detector 19 for measuring the amplitude of the wanted output signals on said outputs. The receiver 1 comprises a control circuit μC whereto the measured amplitude detector output signal is applied. The control circuit μC derives the AGC signal for the low noise amplifier 3 there from, which signal is lead, here through a DA convertor 20, to the amplifier 3. Similarly both DC-offset determining means 15-1, 15-2 are coupled through control circuit μC to the DA convertors 16-1, 16-2. The DC blocking outputs 18-1, 18-2 are each coupled to hard limiters 21-1, 21-2, such that the zero crossings contain the actual information. Both hard limiters are coupled to a demodulator 22 for finally providing a demodulated baseband output signal on demodulator output 23.

The operation of the quadrature offset correction circuit I1, Q1 in the receiver 1 as shown in a digital implementation, is as follows. After receipt on the antenna 2 and amplification in amplifier 3 with an AGC determined amplification factor a high frequency modulated input signal is filtered in filter 4 for image frequency rejection. The filtered signal is then down converted in one or more stages to finally base band. Here down conversion is effected in two stages, where the second stage is a quadrature stage. The fist stage comprises down conversion with mixing local oscillator signal LO1 and IF filtering in IF filter 6, while the second stage converts to low-IF, c.q. zero-IF by means of the mixing quadrature oscillator signals LO2I and LO2Q. The result of the down conversion is a quadrature signal on outputs 10-1, 10-2. The quadrature signals contain a DC offset which may originate from a variety of sources. In particular low-IF, such as near zero or zero-IF receivers are sensitive to DC offset in the so called receiver back-end, mainly caused by LO2 feed through into the first IF stage due to finite isolation of the mixers 7-1, 7-2. DC-Offset at the outputs 10-1, 10-2 limits the dynamic range of amplifiers, filters and, in case of a digitised receiver the dynamic range of the AD convertors. In addition it disturbs the electrical balance in receiver circuits and may jeopardise a correct functioning of demodulator schemes, which are based on zero crossings detected in the hard limiters. These DC offset sources and the way wherein they can be corrected are clearly outlined in U.S. Pat. No. 5,422,889, which document content is included here by reference thereto.

DC-offset is corrected in quadrature DC control loop O1, O2 followed by DC blocking in circuits 17-1, 17-2. After AD conversion in convertors 13-1, 13-2 and possible digital processing in channel filters DFI and DFQ the DC content of the channel output signal is looped back, DA converted and negatively added to the baseband input signal for DC correction of the baseband signal in subtracters 9-1, 9-2. This corrects for the variety of offset sources mentioned above and furthermore corrects for DC-offset introduced in particular by the conversion of AD convertors 13-1 and 13-2. Note that this correction will generally take place by switching the AGC and/or local oscillators on and off, such that offset is determined and corrected by the DC loops O1 and O2 during periods of silence in the received signal. As a consequence the DC loops O1, O2 are sensitive to DC offset, including DC drift, occurring during reception, which source of offset will not be corrected by the DC loops O1, O2. The DC offset nulling in the loops O1, O2 prevents the following stages to operate in overload, while the DC blocking circuits 17-1, 17-2 in front of a DC offset sensitive stage, such as hard limiters 21-1, 21-2, remove remaining offsets. Therefore the DC offset loops O1, O2 can be less accurate allowing some DC offset to result, which DC offset is then effectively blocked by the DC blocking circuits 17-1, 17-2. Only one DC blocking circuit 17-1, 17-2, which may be embodied by a high pass filter, for example a digitally implemented phase linear Finite Impulse Response (FIR) structure or an Infinite Impulse Response (IIR) structure, has appeared to be sufficient in practise. In addition the trade-off regarding required DC offset between the DC offset loops O1, O2 and the DC blocking circuits 17-1, 17-2 surprisingly allows the use of these loops O1, O2 to adjust the receiver 1 for minimum back-end second order distortion, rather than minimum DC offset.

Apart from a quadrature or two IF stage structure the receiver 1 may be a single stage low-IF, near zero-IF, or zero-IF structure. The AD convertor 13-1, 13-2 may for example be a sigma-delta convertor, such that the decimation filters in the digital filters DFI, DFQ are being used for suppressing the quantisation noise of the 1-bit output signal of the sigma-delta AD converter.

The receiver I and Q path can also be implemented in an analog way, in which case the AD converters 13-1, 13-2 will not be present. Then the channel filter means DFI and DFQ will instead be implemented by analog filters, and the DC blocking filters 17-1, 17-2 will then be analog DC blocking filters. Communication of the detectors 15-1, 15-2 and 19 will normally take place to a—not necessarily—digitally implemented control circuit μC, then requiring AD interfacing, as well as DA interfacing for communication to summing devices 9-1, 9-2 and to amplifier 3.

Whilst the above has been described with reference to essentially preferred embodiments and best possible modes it will be understood that these embodiments are by no means to be construed as limiting examples of the devices concerned, because various interchanges, modifications, features and combination of features falling within the scope of as appended claims are now within reach of the skilled person.

The invention claimed is:

1. A receiver (1) comprising a DC-offset correction circuit (I1, Q1), said DC-offset correction circuit comprising:

a DC-offset control loop embodied by:

a summing device having a signal path input, a DC control input, and a summing output; and an offset determining means coupled between the summing output and the DC control input of the summing device; and a DC blocking circuit coupled to the summing output of the summing device and having a DC blocking output for providing an offset corrected output signal, whierein the receiver (1) comprises channel filter means (DFI, DFQ) coupled between the summing device (9-1, 9-2) and the DC blocking circuit (17-1, 17-2).

2. The receiver (1) according to claim 1, characterised in that the channel filter means comprise analog or digital fitters (DFI, DFQ), in case of an analog or digital implementation respectively of said channel filter means.

3. The receiver (1) according to one of the claims 1, characterised in that the receiver is a quadrature receiver (1).

4. The receiver (1) according to one of the claims 1, characterised in that the receiver is a low-IF receiver, or a zero-IF receiver.

5. The receiver (1) according to one of the claims 1, characterised in that the receiver is a double conversion receiver (1).

6. The receiver (1) according to one of the claims 1, characterised in that the receiver (1) is provided with analog to digital (AD) converters (13-1, 13-2) and/or digital to analog (DA) converters (16-1, 16-2; 20).

7. The receiver (1) according to one of the claims 1, characterised in that the receiver (1) is provided with switchable means (3, 5, 7-1, 7-2).

* * * * *